UNITED STATES PATENT OFFICE.

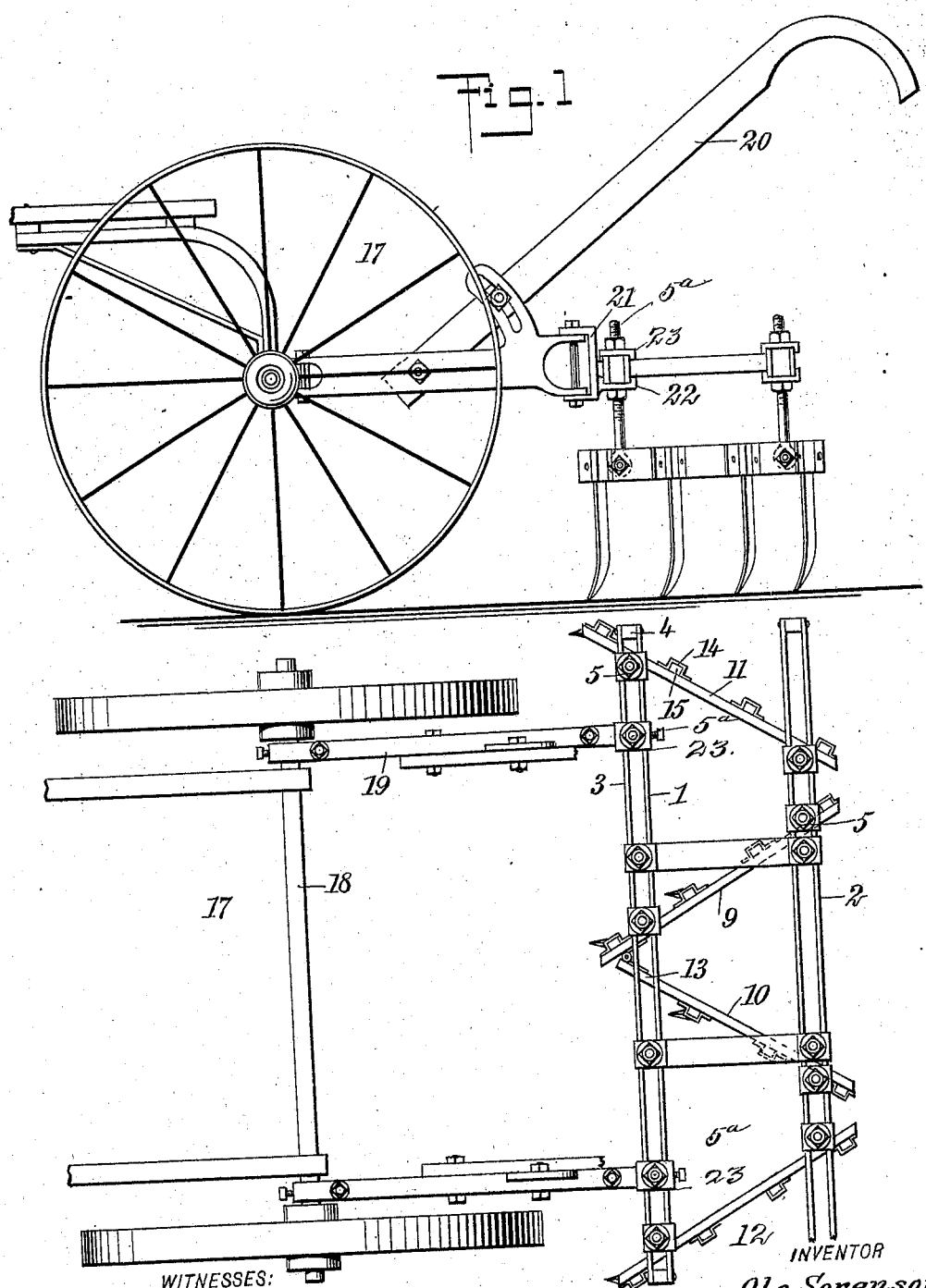

OLE SORENSON, OF FOWLER, COLORADO.

BEET-CULTIVATOR.

No. 815,652.     Specification of Letters Patent.     Patented March 20, 1906.

Application filed September 5, 1905. Serial No. 277,001.

*To all whom it may concern:*

Be it known that I, OLE SORENSON, a citizen of the United States, and a resident of Fowler, in the county of Otero and State of Colorado, have invented a new and Improved Beet-Cultivator, of which the following is a full, clear, and exact description.

This invention relates to agricultural implements, and concerns itself especially with the construction of an implement for cultivating beets.

The invention consists in the construction and combination of parts to be more fully described hereinafter and definitely set forth in the claims.

Reference is to be had to the accompanying drawings, forming a part of this specification, in which similar characters of reference indicate corresponding parts in both views.

Figure 1 is an end elevation of the cultivator, and Fig. 2 is a plan.

Referring more particularly to the parts, I provide a pair of parallel beams 1 and 2. These beams are composed of parallel rails 3, which are attached permanently at their extremities to blocks 4, as indicated. Through the space formed between the rails 3 heavy bolts 5 pass vertically downward, as indicated most clearly in Fig. 1. The upper extremities of these bolts are threaded, so as to receive nuts 6, and they pass through saddles or clamping-plates 7. These saddles consist simply of plates having bent edges constituting flanges 8, which engage over the sides of the beams, as shown most clearly in Fig. 1. These saddles are adapted to be slid along to any desired position and may be clamped rigidly to the beams by means of the nuts, as will be readily understood.

To the lower extremities of the bolts 5 I attach two main hoe-bars 9 and 10 and auxiliary side hoe-bars 11 and 12. At their forward extremities the hoe-bars 9 and 10 are connected by a hinge 13, so that a movable joint is formed at this point, enabling the angular relation between the bars 9 and 10 to be adjusted as desired. I prefer to support the forward extremity of the bar 9 by means of one of the bolts 5, as shown in Fig. 2, while the rear extremities of the bars 9 and 10 are supported each by one of the bolts 5, as indicated. Evidently by means of these bolts at the rear the bars 9 and 10 may be clamped rigidly in any desired angular position. To the sides of the hoe-bars 9, 10, 11, and 12 I attach a plurality of socket-plates 14, which are disposed outwardly, so as to form sockets receiving hoes 15. These hoes preferably bend forwardly at their points 16, so that when the implement is advanced across the field they will turn up or cultivate the ground.

The implement described is conveniently attached to a sulky 17, to which a horse may be hitched. To the axle 18 of the sulky draw-bars 19 are attached, which extend rearwardly and carry suitable handles 20. The rear ends of these draw-bars 19 are formed into forks, to which brackets 21 are pivotally attached, as shown, the said brackets being preferably formed integral with special saddle-plates 22. Opposite these saddle-plates are saddle-plates 23, and these are connected by special bolts $5^a$ with the plates 22, affording means for clamping the forward beam 1 therebetween, as will be readily understood.

In using the implement it should be understood that a horse or other draft-animal would be attached at or near the position of the arrow shown in Fig. 2 and the implement would be advanced in the direction indicated by the arrow. The bars 9 and 10 would occupy the space between two adjacent rows of beets. Said rows would pass between adjacent extremities of the bars 9 and 11 and 10 and 12. In this way as the implement passes once across the field it will cultivate two rows or the equivalent of two rows.

Evidently the hoe-bars of the cultivator may be adjusted to correspond with different distances between the beet-rows simply by sliding the saddle-plates laterally and clamping the same at any point desired.

Having thus described my invention, I claim as new and desire to secure by Letters Patent—

1. In a cultivator in combination, a pair of transverse beams, hoe-bars, saddle-plates slidably mounted upon the upper and lower sides of said beams and supporting said hoe-bars, and means for clamping said beams between said saddle-plates in different positions.

2. In a cultivator in combination, a pair of transverse beams comprising parallel bars with openings formed therebetween, bolts passing upwardly through said openings, saddle-plates through which said bolts pass and slidably mounted on the upper and lower sides of said beams, nuts carried on said bolts and seating against said saddle-plates, and inclined hoe-bars attached to said bolts.

3. In a cultivator in combination, a pair of transverse beams, a pair of inclined hoe-bars having a hinged connection therebetween, saddle-plates adapted to clamp to said beams and supporting said hoe-bars, said hoe-bars being disposed at the sides of the said main bars, and saddle-plates attached to said beams and supporting said side hoe-bars.

In testimony whereof I have signed my name to this specification in the presence of two subscribing witnesses.

OLE SORENSON.

Witnesses:
SELDEN T. SMITH.
WALTER M. BERRY.